United States Patent
Parkins

(10) Patent No.: US 9,609,411 B2
(45) Date of Patent: *Mar. 28, 2017

(54) MICROPHONE ENVIRONMENTAL PROTECTION DEVICE

(71) Applicant: Red Tail Hawk Corporation, Philadelphia, PA (US)

(72) Inventor: John W. Parkins, Philadelphia, PA (US)

(73) Assignee: Red Tail Hawk Corporation, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/734,302

(22) Filed: Jun. 9, 2015

(65) Prior Publication Data

US 2015/0271587 A1    Sep. 24, 2015

Related U.S. Application Data

(63) Continuation of application No. 13/796,579, filed on Mar. 12, 2013, now Pat. No. 9,084,053.

(Continued)

(51) Int. Cl.
*H04R 1/08*        (2006.01)
*H04B 1/3827*    (2015.01)

(52) U.S. Cl.
CPC ............ *H04R 1/086* (2013.01); *H04B 1/385* (2013.01); *H04R 2410/07* (2013.01); *Y10S 2/906* (2013.01); *Y10S 2/909* (2013.01)

(58) Field of Classification Search
CPC .......... H04R 1/086; H04R 1/22; H04R 25/48; H04R 25/00; H04R 1/342; H04R 5/0335;

(Continued)

(56) References Cited

U.S. PATENT DOCUMENTS 2,643,729 A    6/1953    McCracken
2,908,772 A    10/1959    Adler
(Continued)

FOREIGN PATENT DOCUMENTS

DE    102007034230 A1    1/2009
JP    2004328231    11/2004
(Continued)

OTHER PUBLICATIONS

Type 3.4 (artificial ear) Pinna simulator—simplified. International Telecommunications Union standard ITU-T p. 57. Nov. 2005.

(Continued)

*Primary Examiner* — Davetta W Goins
*Assistant Examiner* — Oyesola C Ojo
(74) *Attorney, Agent, or Firm* — Brown & Michaels, PC

(57) ABSTRACT

A device for protecting a microphone sensing surface, such as a diaphragm, from the detrimental effects of the ambient environment. The device incorporates a perforated surface to protect the microphone and in conjunction with a chamber volume creates an acoustic resonance in the 1 kHz to 20 kHz spectrum, which improves the microphone signal-to-noise ratio performance. The microphone is acoustically coupled to the chamber volume for sensing pressure of the ambient environment. There is no line of sight to the microphone sensing surface from the ambient environment, so that rain, wind and sand have no direct path to the microphone sensing surface. The perforations of the outer surface are small to prevent objects from contacting the microphone sensing surface via a direct path. Water drains from the chamber volume and does not become trapped if an embodiment of the invention is temporarily submerged so that the microphone returns to normal operation quickly.

12 Claims, 6 Drawing Sheets

Related U.S. Application Data

(60) Provisional application No. 61/751,527, filed on Jan. 11, 2013.

(58) Field of Classification Search
CPC .... H04R 1/033; H04R 1/1016; H04R 1/1066; H04R 1/1075; H04R 1/1058; H04R 1/225; Y10S 2/909; Y10S 2/906; H04B 1/385; H04B 2001/3894; H04B 2001/3866
USPC ................ 381/189, 186, 375, 373, 371, 376
See application file for complete search history.

(56) References Cited

U.S. PATENT DOCUMENTS

| | | | |
|---|---|---|---|
| 2,946,862 | A | 7/1960 | Wadsworth et al. |
| 3,043,912 | A * | 7/1962 | De Laney ............ H04M 9/001 181/148 |
| 3,683,130 | A | 8/1972 | Kahn |
| 3,952,158 | A | 4/1976 | Kyle et al. |
| 3,979,567 | A | 9/1976 | Frye |
| 4,006,318 | A | 2/1977 | Sebesta et al. |
| 4,088,849 | A | 5/1978 | Usami et al. |
| 4,335,281 | A | 6/1982 | Scott et al. |
| 4,441,576 | A | 4/1984 | Allen |
| 4,570,746 | A | 2/1986 | Das et al. |
| 4,586,194 | A * | 4/1986 | Kohashi ............ H04R 29/001 381/60 |
| 4,924,502 | A | 5/1990 | Allen et al. |
| 4,972,491 | A | 11/1990 | Wilcox, Jr. |
| 5,086,789 | A | 2/1992 | Tichy |
| 5,305,387 | A | 4/1994 | Sapiejewski |
| 5,333,206 | A | 7/1994 | Koss |
| 5,357,585 | A | 10/1994 | Kumar |
| 5,426,719 | A | 6/1995 | Franks et al. |
| 5,526,430 | A * | 6/1996 | Ono ...................... H04R 1/406 381/26 |
| 5,551,090 | A | 9/1996 | Thompson |
| 5,675,660 | A | 10/1997 | Townsend |
| 5,887,286 | A | 3/1999 | Waldron |
| 6,091,830 | A | 7/2000 | Toki |
| 6,445,805 | B1 | 9/2002 | Grugel |
| 6,567,525 | B1 | 5/2003 | Sapiejewski |
| 6,683,965 | B1 | 1/2004 | Sapiejewski |
| 7,212,645 | B2 | 5/2007 | Le Gette et al. |
| 7,352,871 | B1 | 4/2008 | Mozo |
| 7,564,989 | B2 | 7/2009 | Schanz |
| 7,668,332 | B2 | 2/2010 | Williams et al. |
| 7,843,021 | B2 | 11/2010 | Zhe et al. |
| 8,009,851 | B2 * | 8/2011 | De Pooter ............ H04R 1/086 381/355 |
| 8,059,851 | B2 | 11/2011 | Pfanner |
| 8,213,643 | B2 | 7/2012 | Hemer |
| 8,224,011 | B2 | 7/2012 | Heringslack |
| 8,325,951 | B2 | 12/2012 | Wang |
| 2003/0095670 | A1 | 5/2003 | Wurtz |
| 2003/0185403 | A1 | 10/2003 | Sibbald |
| 2004/0047486 | A1* | 3/2004 | Van Doorn ............ H04R 1/08 381/355 |
| 2004/0165742 | A1 | 8/2004 | Shennib et al. |
| 2004/0198240 | A1 | 10/2004 | Oliveira |
| 2006/0013409 | A1 | 1/2006 | Desloge |
| 2006/0153414 | A1 | 7/2006 | Liao |
| 2007/0189563 | A1 | 8/2007 | Sjursen et al. |
| 2008/0025524 | A1 | 1/2008 | Vaudrey et al. |
| 2008/0187150 | A1* | 8/2008 | Heringslack ........... H04R 1/086 381/72 |
| 2009/0041285 | A1 | 2/2009 | Parkins et al. |
| 2010/0080400 | A1 | 4/2010 | Sibbald et al. |
| 2010/0225461 | A1 | 9/2010 | Tuli |
| 2010/0303270 | A1 | 12/2010 | Parkins |
| 2011/0116671 | A1 | 5/2011 | Jensen |
| 2011/0164757 | A1 | 7/2011 | Sibbald et al. |
| 2011/0261965 | A1 | 10/2011 | Parkins |
| 2012/0148083 | A1 | 6/2012 | Knauss et al. |
| 2012/0263330 | A1 | 10/2012 | Larsen |

FOREIGN PATENT DOCUMENTS

| | | |
|---|---|---|
| WO | 2006118516 A1 | 11/2006 |
| WO | 2007052866 A1 | 5/2007 |
| WO | 2011116246 A1 | 9/2011 |

OTHER PUBLICATIONS

Hammershoi et al. "Sound transmission to and within the human ear canal" J. Acoust. Soc. Am. 100(1). Jul. 1996.

Burkhard et al. "Anthropometric Manikin for Acoustic Research." J. Acoust. Soc. Am. 58(1). Jul. 1975.

Partial International Search Report and Written Opinion for PCT/US2014/010830 Issued on Jan. 9, 2014.

* cited by examiner

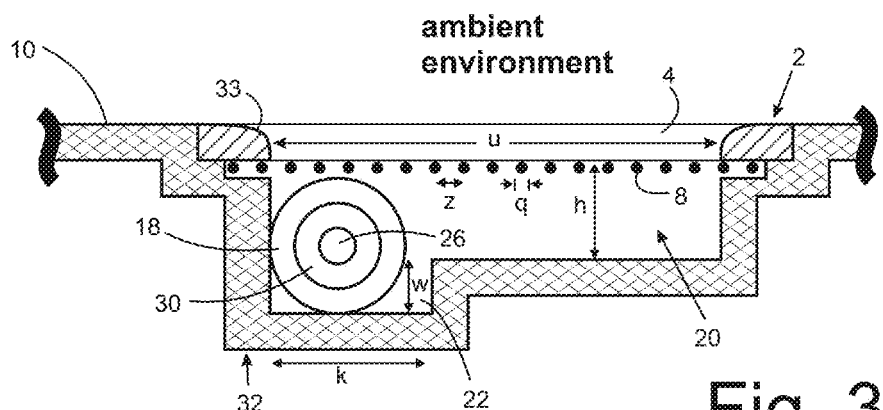
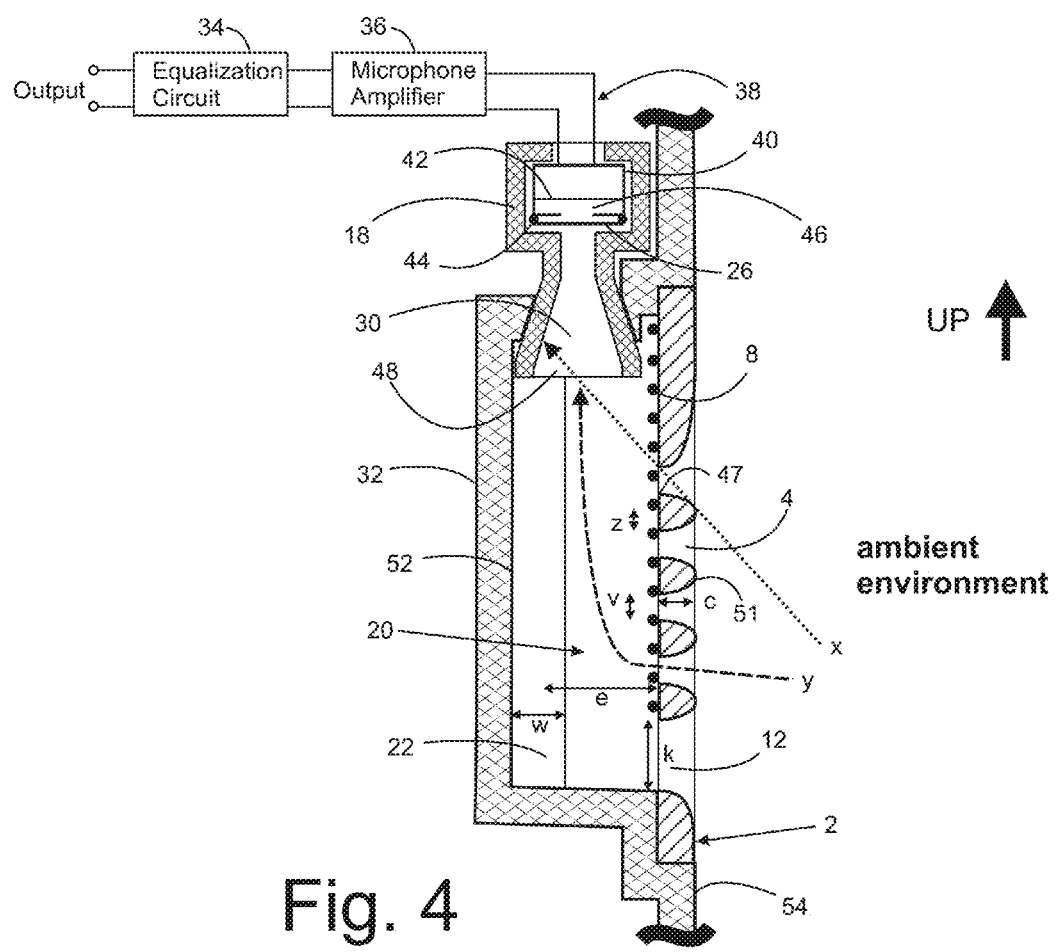

MICROPHONE ENVIRONMENTAL PROTECTION DEVICE

REFERENCE TO RELATED APPLICATIONS

This is a continuation patent application of copending application Ser. No. 13/796,579, filed Mar. 12, 2013, entitled "Microphone Environmental Protection Device", which claimed benefit under 35 USC §119(e) of provisional application No. 61/751,527, filed Jan. 11, 2013, entitled "Microphone Environmental Protection Device". The aforementioned applications are hereby incorporated herein by reference.

BACKGROUND OF THE INVENTION

Field of the Invention

This invention relates to devices used to protect microphones from the ambient environment.

Description of Related Art

Microphone screens typically incorporate porous materials, such as foamed material and metal mesh, to protect the microphone sensing surface, such as a diaphragm from being damaged by objects, such as fingers, and to prevent wind noise. Inventions such as those described in U.S. Pat. No. 7,496,208, U.S. Pat. No. 2,520,706 and U.S. Pat. No. 3,154,171 illustrate such examples.

However, there are significant problems with using porous materials such as foam. Foam and other similar porous materials become clogged with water when submerged or subject to rain. Porous materials absorb and hold water, dirt and salt crystals which change the nature of the sound sensed by the microphone. High frequency sounds are attenuated; therefore, the microphone signal no longer provides an accurate representation of sound in the ambient acoustic environment.

Microphones have inherent noise associated with them called "self-noise." Even in a perfectly quiet ambient environment, microphones will generate electrical noise at their output. This noise is due to the self-noise of electrical amplifier components, such as the "Johnson noise" of resistances and "flicker noise" of transistors. The acoustical and mechanical damping of a microphone diaphragm also contributes to the self-noise of a microphone.

The "input referenced self-noise" (IRSN) of a microphone is the equivalent sound pressure level (SPL) that would generate the same noise at the electrical leads as the total effective self-noise of the microphone. The IRSN is typically described as an A-weighted value with units of decibels sound pressure level, or dB SPL, which is a weighted average over a frequency band. However, the IRSN may also be described as a dB SPL value at a single frequency.

Microphones with high self-noise can mask data, such as speech or music, when the data is at low levels. All other parameters being equal, microphones with lower self-noise are superior to microphones with higher self-noise.

SUMMARY OF THE INVENTION

The present invention protects a microphone from rain, wind, dirt, salt crystals and objects using a chamber having a perforated barrier. Fingers, vegetation, equipment and other objects are kept from contacting and damaging the microphone sensing surface, and a line of sight path from the ambient environment to the microphone is prevented, so that small particles such as sand and dust, water and wind do not impact directly on the microphone sensing surface or on an acoustic vent used to provide a waterproof barrier for the microphone. This provides improved damage protection.

Acoustic amplification of sound may be provided, which can result in an improvement of the signal-to-noise ratio of the microphone output signal.

In one embodiment, the invention can be attached to a noise-defending headset ear cup. In this embodiment the microphone is used to sense the sound outside of the ear cup and the microphone signal is input to an electronic processing circuit that is used to shape the signal and provide amplification and/or attenuation of the signal. The processing circuit signal output is input to an amplifier that is connected to a speaker to generate sound in the ear cup. In this way, the user can monitor ambient sounds and modify the amplitude and frequency content of the sounds to suit his/her needs. An embodiment of the invention may also be incorporated in manikins or other mechanical structures used to mimic the diffraction of sound around the human head.

BRIEF DESCRIPTION OF THE DRAWING

FIG. 3 is a cross-sectional view of an embodiment of the invention along cut line B-B from FIG. 1.

FIG. 4 is a cross-sectional view of an embodiment of the invention along cut line A-A from FIG. 1.

DETAILED DESCRIPTION OF AN EMBODIMENT OF THE INVENTION

Figure 1:
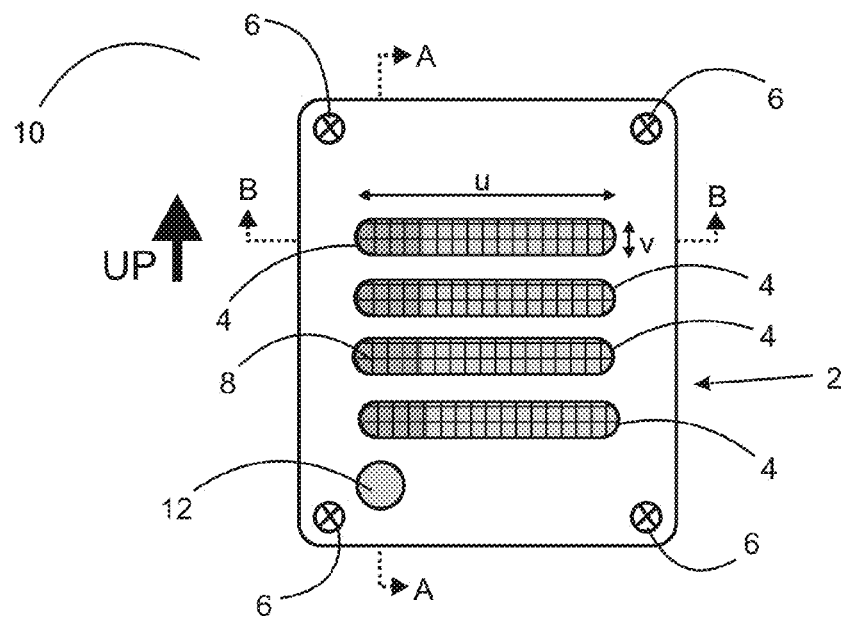
FIG. 1 is a view of an embodiment of the invention as it would be incorporated into a vertical outer surface.

An embodiment of the invention is a device for protecting microphones against environmental damage which incorporates a special perforated barrier on the outer surface of a chamber, which provides a line of sight from outside the chamber volume to inside the chamber volume. The cross-sectional area of the perforations are large enough that water can easily pass through the barrier and the barrier is self-cleaned with rain or can be cleaned deliberately with a spray bottle. An outer layer of the barrier can be made of a solid rigid material, such as plastic or metal, with slotted perforations backed by an inner layer of metal mesh material.

A drainage path can be provided for water and debris that accumulate in the chamber volume. The water drain may be a path back through the perforated barrier, or a separated dedicated drain path can be provided. This allows the device to be self-cleaning during rain and easily to clean using a spray bottle.

The barrier in this embodiment is a rigid perforated surface forming a chamber which creates an effective acoustic mass. The total volume of the chamber creates an effective acoustic compliance. The combination of these two elements in this embodiment of the invention creates an acoustic resonator that is preferably in the frequency range of 1 kHz to 20 kHz.

Microphones have electronic and acoustic self noise. If the sound sensed by the microphone is increased, the effective signal-to-noise ratio of the microphone increases and yields an effectively quieter microphone signal for the same ambient acoustic noise signal.

An equalizer circuit (active or passive) can be connected to the output of the microphone to attenuate the frequency region of boosted signal. Therefore, because the microphone signal is attenuated, the self-noise of the microphone is reduced. However, because the acoustic resonator amplifies the sound through acoustical means, the measured signal strength remains at the same amplitude. Therefore, the signal-to-noise ratio of the microphone output is increased by the resonator of an embodiment of the invention and the effective IRSN is reduced which yields a higher quality microphone.

The microphone is located in a position relative to the chamber where there is no direct line of sight from the ambient environment outside the chamber to the sensing surface of the microphone. It will be understood that as used herein the phrase "no direct line of sight" is intended to mean that the sensing surface is located outside of, or spaced apart from, any imaginary sight line passing from the environment through the chamber. In other words, it is the location and conformation of the chamber and its relationship to the sensing surface of the microphone which provides the lack of line-of-sight from the environment to the sensing surface, rather than the prior art arrangement of having the sensing surface facing the environment with only a physical barrier such as a solid or foam or cloth cover providing the protection between the sensing surface and the environment.

In this way, any wind, sand or rain that is blown into the chamber through the perforated barrier makes its first contact with the physical structure of the chamber, instead of the microphone sensing surface, which reduces the kinetic energy compared to an unobstructed path. This helps protect the microphone sensing surface, such as a diaphragm, which can be damaged by the force from direct impact of rain or objects. Microphones, such as condenser, MEMS, dynamic and piezoelectric employ various types of sensing surfaces, such as single and multiple diaphragms and piezoelectric solids among others.

The microphone used in an embodiment of the invention is preferably waterproof. However, an additional waterproof membrane, called an acoustic vent, can be incorporated to block the path to the microphone sensing surface to ensure that the microphone is not damaged by contact with water. Acoustic vents may be attached directly to the front face of a microphone or other locations, such as the end of a microphone coupler, which would provide a water tight seal between the ambient environment and the microphone sensing surface.

FIG. 1 depicts a view of an embodiment of the invention as it would be incorporated into a vertical outer surface with "UP" indicating the direction of higher altitude. A perforated cover 2 is attached to an outer surface 10, using flush-mounted screws 6. Alternatively, screws may be fastened from behind the outer surface so that the screws cannot be seen from the perspective shown.

The perforated cover 2 incorporates at least one slot perforation 4 having a length u and a height v. In a preferred embodiment, slot perforations are rounded at the ends and do not have sharp edges to help minimize wind turbulence when wind blows across the outer surface 10.

Behind the slot perforations, a screen 8 is attached to the back of the perforated cover 2. The screen 8 is preferably made of wire and coated with an oleophobic coating that tends to repel oil and other fluids, although other coatings, such as hydrophobic coatings, may also be used that tend to repel water and other fluids. The screen 8 prevents objects longer than slot length u from passing lengthwise through the slots. Alternatively, the screen 8 can be attached to the front of the perforated cover 2 to improve wind noise reduction.

A drain output 12 is located near the bottom of the perforated cover 2. The drain output 12 is incorporated to more easily allow water, dirt and debris to drain out of the interior of an embodiment of the invention. The screen 8 does not cover the drain output 12, so that dirt and other particles that may pass through the screen 8 to exit the interior of an embodiment of the invention.

Figure 2:
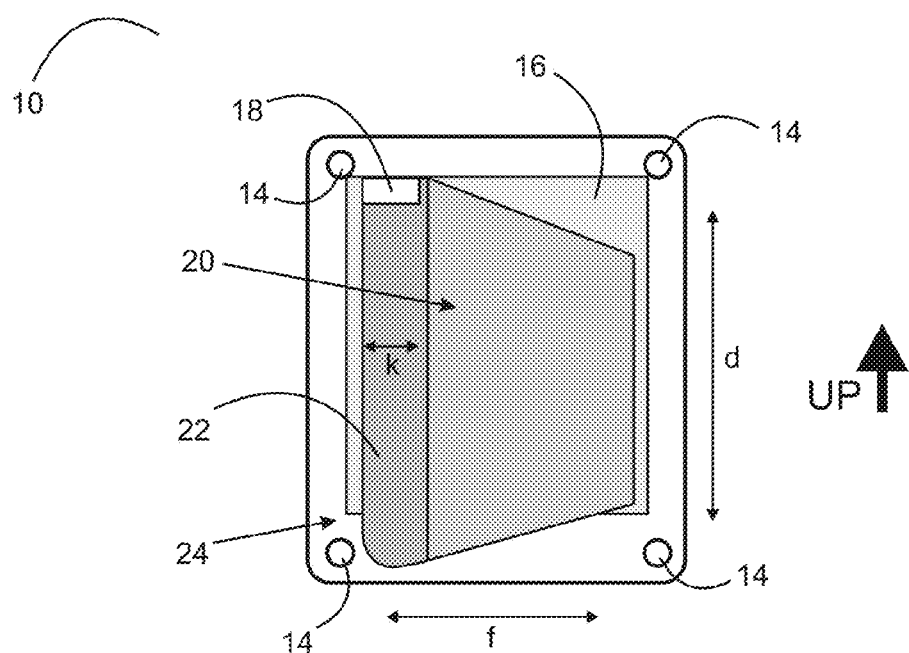
FIG. 2 is a view of the interior of an embodiment of the invention with the perforated cover, screen and screws removed.

FIG. 2 is a view of the interior 24 portion of an embodiment of the invention, with the perforated cover 2, screen 8 and screws 6 removed. Screw holes 14 are provided to receive the screws 6 that secure the perforated cover 2. A rectangular screen recess 16 is incorporated to provide room for the screen 8 when the perforated cover 2 is attached. Within the interior 24 there is a chamber 20 with average width f and average height d (averages are used here because the interior is irregular).

At the upper end of the interior 24 is located a microphone coupler 18 which is acoustically coupled to the chamber 20. The coupler 18 is preferably made of elastomeric material such as molded silicone or other compliant material.

The chamber 20 is enclosed by the interior structure and elements of an embodiment of the invention such that if water enters the chamber through the slot perforations 4 or drain output 12, the only path for water to drain from the chamber is through slot perforations 4 and drain output 12.

Within the chamber 20 is a recessed drain channel 22 with width k. The recessed drain channel 22 could be located as shown in the figure, or, alternatively could be centered, relative to dimension f, within the chamber 20. The drain channel 22 may incorporate other geometries, such as an "hour glass" design where the drain channel becomes restricted in the middle, relative to dimension d of chamber 20, while having greater width at the top, where the microphone coupler 18 is located, and at the bottom, where the drain output 12 would be located. The "hour glass" design provides for larger diameter microphone couplers and drain diameters while minimizing the total chamber 20 volume.

FIG. 3 is a cross-sectional view of an embodiment of the invention along the cut line B-B from FIG. 1, cut through the length u of one of the slots 4. In this view of an embodiment of the invention, a portion of the chamber has a depth h while the drain channel 22 is recessed further by depth w. Preferably, depth h should be greater than 1 mm to facilitate water drainage and prevent water retention. The interior geometry may be curved instead of the sharp edges shown in FIG. 3.

The drain channel 22 provides for improved draining of water from the chamber 20 but also allows room for incorporating larger diameter microphones and microphone couplers 18 without increasing the total chamber 20 volume appreciably. The drain channel is shown to one side of the chamber 20 but could as well be centered relative to dimension f, or placed in other locations in the chamber 20.

The microphone coupler 18 has a coupler sound channel 30 that couples sound to an acoustic vent 26. The microphone coupler 18 in this embodiment is located in the drain channel 22 because it is larger in diameter compared to h.

A cross-sectional view of the slot perforation 4 can be seen in FIG. 3 with smooth contoured surfaces, such as a contour surface 33 facing the ambient environment instead of sharp edges to minimize wind turbulence and acoustic wind noise. The screen 8 has a mesh spacing z and a screen diameter q when the screen 8 incorporates cylindrical webbing such as metal wire and is shown here attached to the back of the perforated cover 2 to protect the screen 8 from damage. Alternatively, the screen 8 can be attached to the front of the perforated cover 2 for improved wind noise reduction.

The perforated cover 2 is attached to an enclosure 32. The perforated cover 2 and enclosure 32 define the chamber 20 volume. The enclosure 32 extends to form the outer surface 10 in this embodiment. In another embodiment, the enclosure could be a separate component from the outer surface that attaches to the outer surface.

FIG. 4 is a cross-sectional view of an embodiment of the invention along cut line A-A from FIG. 1, through the width v of the slots 4. The slots 4 have a thickness c measured between inner edge 47 and outer surface 51.

Wind turbulence causes undesirable acoustic noise. Preferably, the slots 4 have smooth outer surfaces 51 instead of sharp edges to reduce turbulence due to wind when wind blows across the perforated cover 2. The slot 4 inner edges 47 do not cause appreciable turbulence because wind is not blowing over this edge. However, the inner edge 47 may be contoured in alternative embodiments.

This cross-sectional view shows the microphone coupler 18 with a horn-shaped coupler sound channel 30 (although other geometries may be used), attached to a microphone 40. Alternatively, the microphone 40 can be completely or partially installed within the chamber 20 to minimize the length of the coupler sound channel 30, or if desired the microphone coupler 18 can be eliminated altogether. In the preferred embodiment, the microphone coupler 18 provides a water tight seal around the microphone 40.

The coupler sound channel 30 couples sound from the chamber 20 to the acoustic vent 26. The acoustic vent 26 is gas permeable and couples sound to the microphone 40. The acoustic vent 26 is used to prevent water and dirt from impinging on a microphone sensing surface 42, such as a fragile diaphragm. Preferably, the acoustic vent 26 is mounted to the microphone 40 with an adhesive 44 to cover a microphone inlet 46 and creates a water-tight seal.

As used herein, a "microphone inlet" is a perforation in a microphone housing to allow sound to be coupled to a microphone sensing surface from outside the microphone housing to inside the microphone housing. A "microphone sensing surface", such as a diaphragm, typically vibrates in response to sound excitation, and this vibration is converted into an electrical signal using various means known in the art.

Sound impinging on the exterior of the perforated cover 2 passes through the slots 4 and screen 8 and into the chamber 20, then through coupler inlet 48, coupler sound channel 30, acoustic vent 26 and microphone inlet 46, where it is sensed by the microphone sensing surface 42.

The slotted perforated cover 2 helps protect the acoustic vent 26 from rain, wind and sand as well as fingers and other foreign objects. Water that penetrates the perforated cover 2 runs down the chamber 20 and back out through the bottom slot perforations 4 and drain output 12. The screen 8 prevents objects smaller than the slot dimensions u and v from entering the chamber 20. Objects smaller than the mesh spacing z of screen 8 can enter the chamber 20; however, they tend to fall to the bottom of the chamber 20.

The drain output 12 has diameter k that is larger than the mesh spacing z so that small objects the size of the mesh spacing z can exit the chamber 20 easily without being trapped. The drain output 12 is located at the bottom of the chamber 20 so that gravity tends to pull water out of the chamber 20 via the drain output 12. Thus, if any objects smaller than mesh z do enter the chamber 20, water will wash the objects out of the chamber 20 through the drain output 12. In this way, an embodiment of the invention tends to be self-cleaning.

When an embodiment of the invention is used near an environment where salt spray is present, salt crystals will not become trapped as they would if a porous foam material were incorporated. Any salt crystals that form from dried salt spray are also washed down the drain channel 22 during the next rain, and will exit through the drain output 12.

The microphone 40 is located at the top of the chamber 20 so that any water which might enter the microphone area will fall out of the coupler sound channel 30 into the chamber 20 and exit out through the drain output 12. Because there are no porous materials within the chamber 20 such as foam, water is not retained in the chamber 20.

The microphone 40 is also located at a position outside of or spaced apart from any imaginary straight line from the ambient environment to the microphone sensing surface 42 or acoustic vent 26 (i.e there is "no line of sight"). That is, the microphone sensing surface 42 or acoustic vent 26 is obscured by the geometry of the microphone coupler 18, the screen 8 and the slot perforations 4. This is shown in FIG. 4 as line of sight x. In this way, water spray and small objects cannot impact the microphone sensing surface 42 through a direct path. The acoustic vent 26 in this embodiment is also obscured and there is no line of sight from the environment to the vent 26.

The acoustic vent 26 may be incorporated in other locations in an embodiment of the invention, such as at the coupler inlet 48; however, care must be taken that there is no direct line of sight to the vent.

In the embodiment as shown in FIG. 4, there are multiple indirect unobscured lines of sight paths y from the ambient environment to the acoustic vent 26. Materials, such as many acoustic foams, that do not have straight unobstructed paths through them tend to become clogged with water, dirt and salt crystals and need to be replaced regularly if they are used outdoors, whereas an embodiment of the invention described herein is self-cleaning and, if desired, can be deliberately cleaned by the user easily. In this embodiment, no material is used in the chamber 20, and water easily drains from the chamber. However, highly porous material can also drain water adequately if there are unobstructed paths through the material, for water draining purposes, and the pores are relatively large in size.

A microphone amplifier 36 is connected to microphone leads 38 to provide bias circuitry and amplification. A passive or active electronic equalization circuit 34 can be connected to the microphone amplifier 36 to create a generally flat frequency response to ambient sound for sound recording or other purposes.

The perforated cover 2 and screen 8 are designed so that the acoustic mass of the two, combined with the acoustic compliance of the chamber 20, form a first acoustic resonance at a frequency between 1 kHz and 20 kHz. The acoustic resonance amplifies the sound pressure in the chamber 20, as compared to the ambient environment at and near the resonance frequency. Boosting the sound pressure has the desired result of improving the effective IRSN of the microphone 40.

The acoustic compliance of the chamber 20 at room temperature is calculated using the equation $C_a=(Vol/1.42\times 10^5)$ m$^5$/N, where Vol is the total volume of the chamber 20 in cubic meters (m$^3$), m stands for meters and N stands for Newtons. The value of Vol is calculated using the equation Vol=edf m$^3$, where e, d and f are the dimensions of the chamber 20 (see FIGS. 2 and 4), measured in meters.

Dimensions of 20 mm for d, 5 mm for e and 18 mm for f are an example of a desirable geometry which yields a volume of 1.8 cc, and an acoustic compliance of $1.27\times10^{-11}$ m$^5$/N. An average chamber depth e of greater than 1 mm is desirable to prevent water from becoming trapped within the chamber volume, and a slot width v of greater than 0.5 mm is desirable to prevent water from becoming trapped in the slots.

The acoustic mass of the perforated cover 2 and screen 8 will be dominated by the perforated cover 2 when the mesh diameter is small compared to the slot thickness c, and the mesh spacing z is similar in size to the slot width v.

The acoustic mass $M_a$ of an individual slot or hole in kg/m$^4$ is approximated by the formula $M_a=1.21$ L/Area (ignoring end effects), where L is the thickness of the slots in meters, Area is the cross sectional area of the slots in square meters and Kg represents kilograms.

An example of desirable dimensions for slot 4 would be 2 mm for the thickness c, and 18 mm for the length u and 1.5 mm for the width v, where c is the thickness, and there are four slots. The diameter of the wires of screen 8 mesh in this embodiment is preferably 0.4 mm while the mesh spacing z is 0.8 mm.

Hence, the acoustic mass of a single slot of this geometry would be approximated as 90 Kg/m$^4$. The equivalent acoustic mass of a plurality of slots of like geometry is equal to the acoustic mass of one slot divided by the number of slots. Hence, the acoustic mass in this preferred embodiment would be approximated as 22.5 Kg/m$^4$.

The acoustic resonance frequency of the resonator in Hertz (Hz) can be calculated by the formula:

$$f_0 = \frac{1}{\left(6.28\sqrt{C_a M_a}\right)}$$

Using the values calculated above, the approximate resonance frequency is 9,400 Hertz (9.4 kHz). However, end effects of the slots and the screen result in higher acoustic mass due to the effective mass of the radiation impedance from the slots 4 and the acoustic mass of the screen 8. End effects must be taken into account when the thickness of the slot is not large compared to the square root of the slot area and the calculations become complicated for slots when the wavelength of the sound is not large compared to the slot length. The end effects also are affected by how much edge contouring the designer uses for the slots.

Measurements of end effects for this geometry with a screen have been made in the Red Tail Hawk Corporation laboratory and yield an effective acoustic mass approximately four times as high as the calculated acoustic mass. Hence, the resulting resonance frequency is approximately 4.7 kHz for the design of this embodiment, rather than the calculated 9.4 kHz.

In the preferred embodiment, the chamber 20 volume Vol is less than 2.32 cc, so that a larger perforated area is not needed in the perforated cover 2 to achieve higher resonance frequencies. A smaller sized perforated area is easier to incorporate in devices such as headsets with earcups that have limited space available.

An acoustic device is considered in the "lumped-element" region when all its dimensions are small relative to the acoustic wavelength in question. A device with resonance frequency below 1 kHz will tend to attenuate high frequencies if the slot or hole perforations are much smaller than a wavelength and the system acts as a lumped-element system at higher frequencies. However, designs with resonances between 1 kHz and 20 kHz will transition out of the lumped-element region and will not attenuate high frequencies so long as the length of the slots is not small in relation to the wavelength of the sound wave.

The wavelength of a sound wave can be calculated as $$\lambda = \frac{s}{f}$$

where $\lambda$ is the wavelength in meters, s is the speed of sound (343 m/sec) and f is the frequency in Hz. A slot of length of 1.8 cm corresponds to a wavelength of 19 kHz. However, the behavior of the slot begins to transition out of the lumped element region at around 1.9 kHz.

Acoustic systems that have geometries both small relative to the wavelengths of the acoustic wave and roughly equal to or greater than the size of the acoustic wave are difficult to analyze with simple math and depend on the angle of acoustic wave incidence. A design, such as the design of this embodiment, must be measured in the laboratory and tweaked to achieve the desired results.

Figure 5:
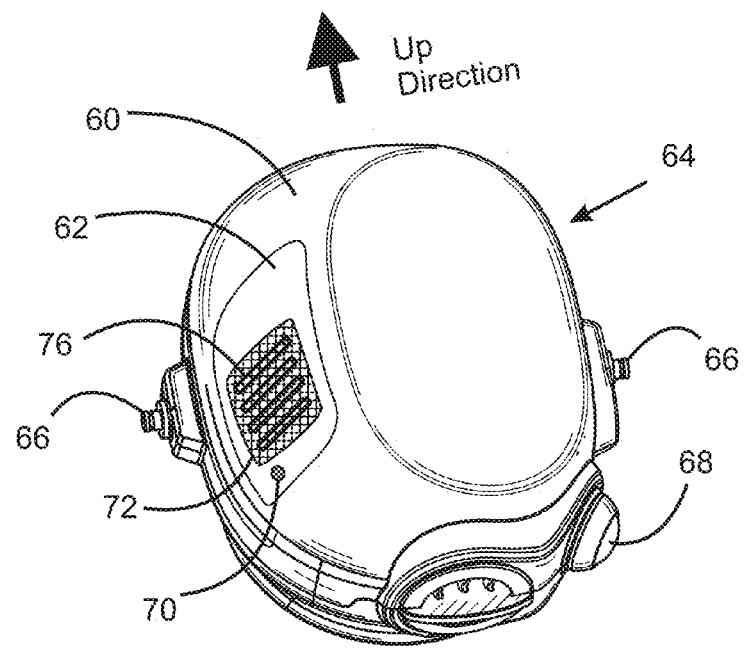
FIG. 5 is a view of an embodiment of the invention using slot perforations as it could be incorporated in an ear cup of a headset.

FIG. 5 shows an embodiment of the invention as it can be incorporated into one of the two ear cups 64 of a headset (not shown). A second ear cup (not shown), generally similar in geometry to the ear cup 64 shown, is typically employed in headsets, with the two earcups coupled by a headband (not shown) attached to both ear cups. Headband attachments 66 are provided on the ear cup 64 to mechanically attach a headband to the ear cup 64.

In this embodiment of an embodiment of the invention, a perforated cover 62 is attached to an outer surface 60 of the earcup, typically using screws (not shown) attached from inside the ear cup 64. In this way, the screw heads cannot be seen from outside the ear cup 64. The enclosure of an embodiment of the invention in this embodiment also forms the outer surface 60 of the ear cup 64. The perforated cover 62 follows the contour of the outer surface 60 of the ear cup 64 to minimize wind turbulence and wind noise. The perforated cover 62 employs slot perforations 76 a screen 72 attached to the front of the perforated cover 62 and a drain output 70. When worn on the head, the drain output 70 is located below the perforated slots 76 to facilitate water drainage. The drain output 70 in this embodiment is located on the perforated cover 62. The screen 72 does not cover the drain in this embodiment.

A partition can be employed behind the enclosure of an embodiment of the invention and within the ear cup to seal an embodiment of the invention and all related circuitry to achieve a waterproof design. In this way, if the headset is submerged in water, no water will penetrate into the partitioned volume. When an embodiment of the invention is incorporated in the ear cup of a headset and the headset is used in wet conditions or submerged, no water damage is caused to the microphone or electronics, and because water drains from the chamber of an embodiment of the invention quickly, normal microphone function is restored once the headset is removed from the water.

Figure 6:
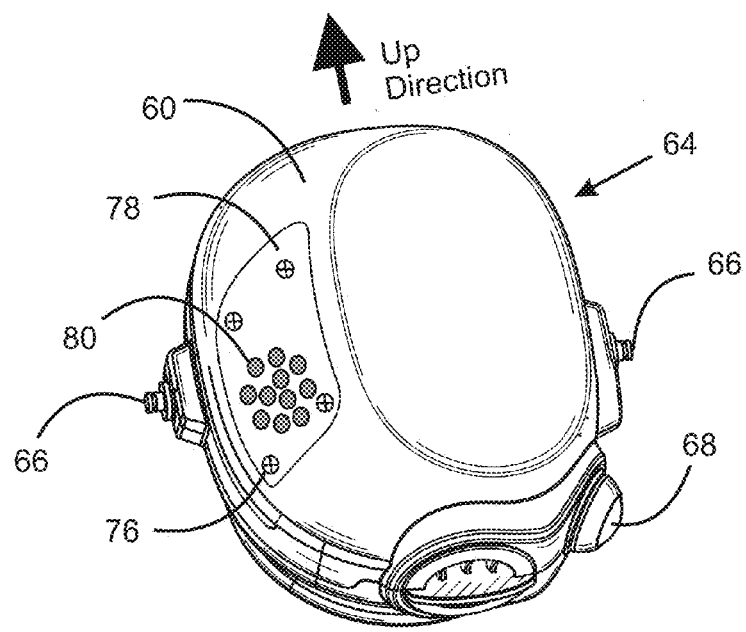
FIG. 6 is a view of an embodiment of the invention using circular perforations as it could be incorporated in an ear cup of a headset.

FIG. 6 shows another embodiment of an embodiment of the invention as it can be incorporated into one of the two ear cups 64 of a headset (not shown). Circle perforations 80 are employed instead of slot perforations in this embodiment. A perforated cover 78 is attached to the outer surface 60 of the ear cup 64 using flush-mounted screws 76. A screen is not employed, nor is a drain output in this embodiment. Water drains from the circle perforations 80 if an embodiment of the invention gets wet.

Figure 7:
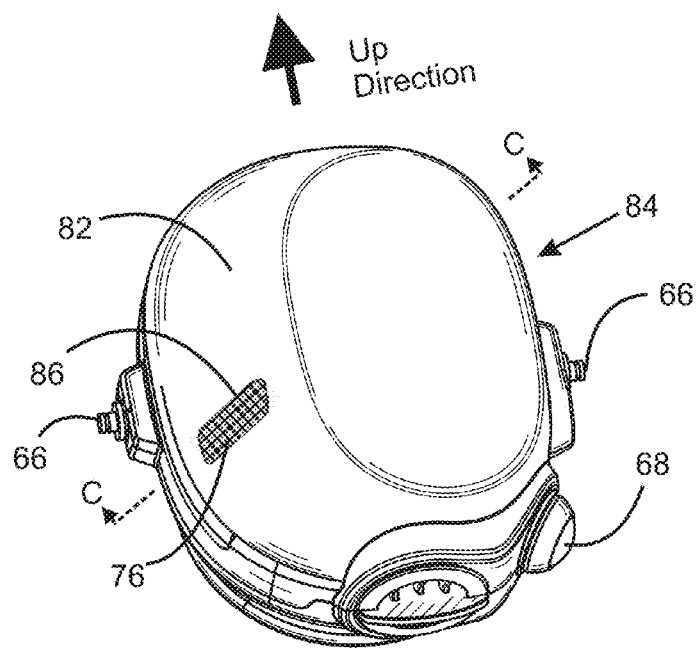
FIG. 7 is a view of an embodiment of the invention using a single slot perforation as it could be incorporated in an ear cup from a headset.
Figure 9:
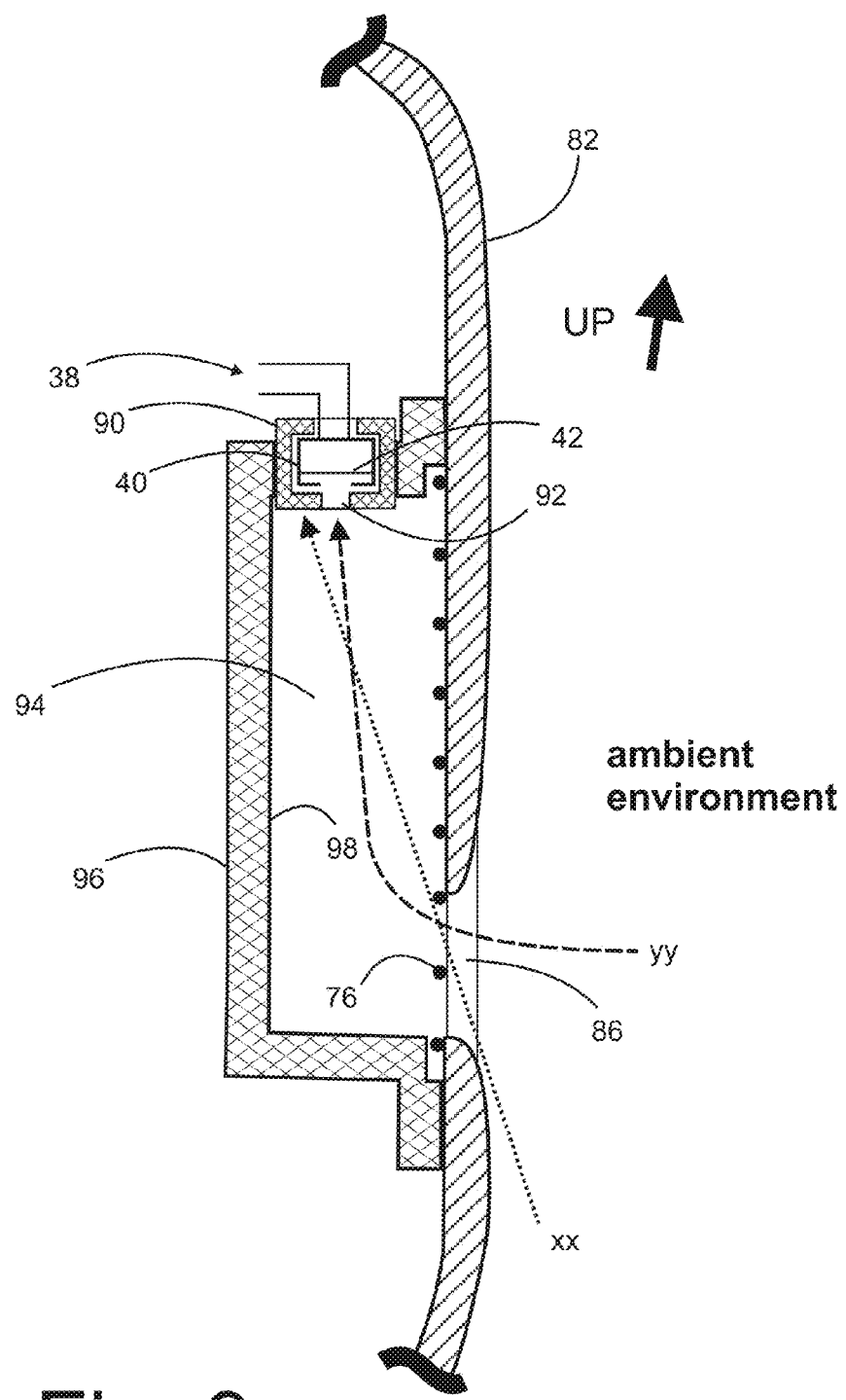
FIG. 9 is a cross-sectional view of an embodiment of the invention along cut line C-C from FIG. 7.

FIG. 7 shows another embodiment of an embodiment of the invention as it can be incorporated into one of the two ear cups 84 of a headset (not shown). FIG. 9 shows a sectional view of the embodiment, cut through lines C-C in FIG. 7.

In this embodiment, only a single slot perforation 86 is employed. The perforated cover in this embodiment is molded into the ear cup 84 body itself. The earcup provides an outer surface 82. The enclosure of an embodiment of the invention in this embodiment is a separate component that is attached to the ear cup from inside the ear cup using screws, adhesive, ultrasonic welding or other means. A screen 76 is employed to keep larger objects from penetrating into the chamber of an embodiment of the invention. Water drains through the single slot perforation 86 and screen 76.

FIG. 9 is a cross-sectional view of an embodiment of the invention along cut line C-C from FIG. 7, through the slot 86. In this embodiment the microphone coupler 90 incorporates a coupler sound channel 92 that is short and cylindrical in geometry, and the microphone coupler 90 is not much bigger than the microphone 40 in overall size. No acoustic vent is employed in this embodiment, and the chamber 94 in this embodiment does not incorporate a recessed drain channel. There is no line of sight from the ambient environment to the microphone sensing surface 42 which helps protect the microphone sensing surface 42 from the direct impact of blowing rain, sand and other objects. (For example, sighting along ray trace xx one cannot see the microphone sensing surface 42.) In this embodiment, the microphone 40 used does not suffer from detrimental effects from exposure to water (waterproof design). If a non-waterproof design were incorporated in this embodiment, an acoustic vent 26 would be used as a water bather for the microphone 40, for example, as shown in FIG. 3 and FIG. 4. There is an indirect unobstructed line of sight yy from the ambient environment to the microphone sensing surface 42. That is, there are no acoustic foams or other materials in the chamber 94 that would block a path from the ambient environment to the microphone sensing surface 42 and tend to retain water.

Figure 10:
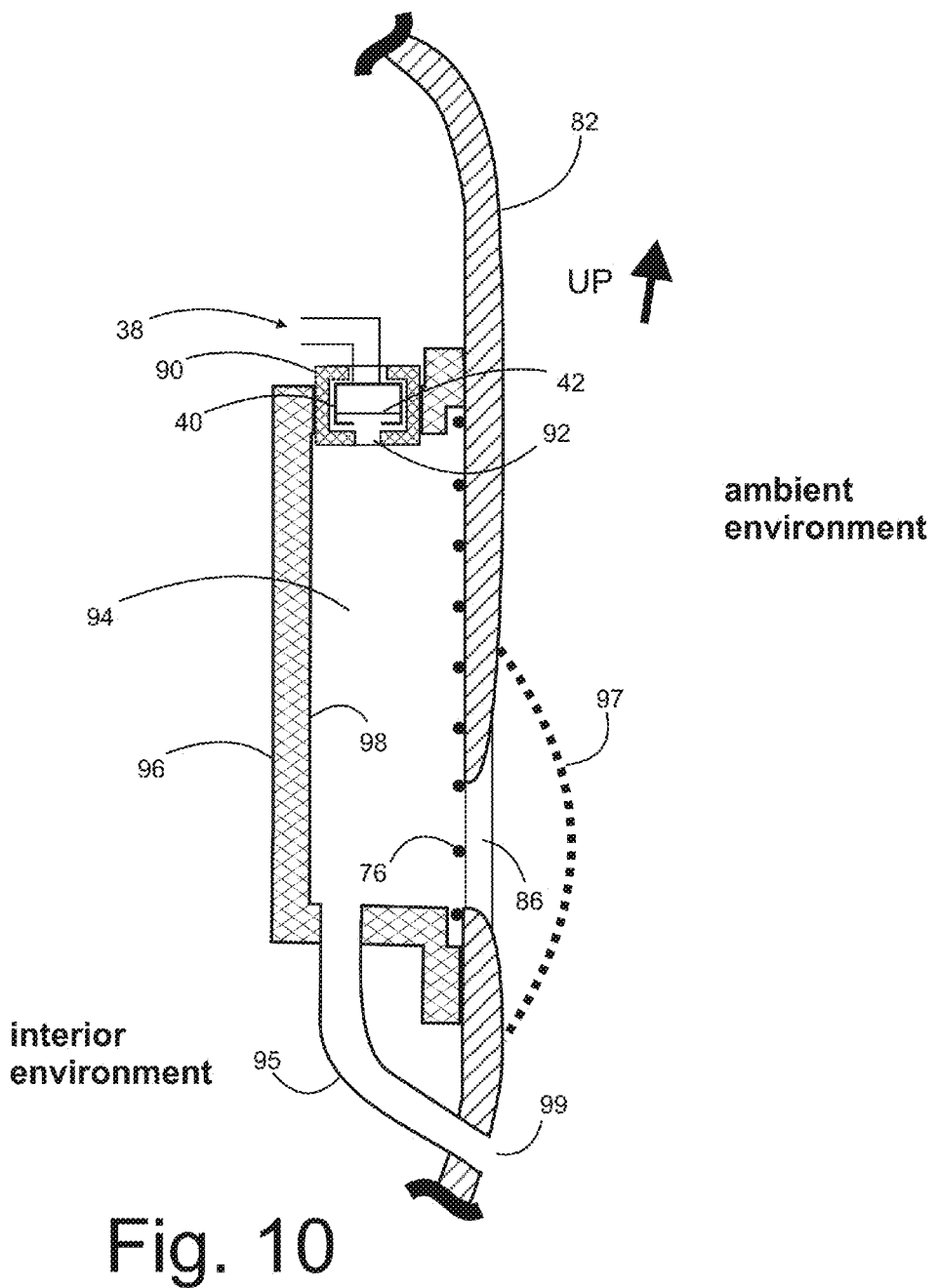
FIG. 10 is a cross-sectional view of an embodiment of the invention incorporating an auxiliary wind screen and drain tube.

FIG. 10 shows a cross-sectional view of an embodiment of the invention incorporating an auxiliary wind screen 97, a drain tube 95 and a drain output 99. The auxiliary wind screen 97 can be attached to the outer surface 82. It may have a geometry that follows the contour of the outer surface 82 or may be bulbous or other geometries that reduce wind noise.

The auxiliary wind screen 97 can be constructed using mesh screen, cloth, gas-permeable membranes, foam or other materials that reduce wind noise but do not alter the acoustic audio-frequency sound sensed by microphone 40 in a detrimental way. The auxiliary wind screen 97 may be thin, for example when employing a single mesh screen or multiple mesh screen layers, or thick, for example when employing foam material with a hollow interior, or solid, for example when employing a solid piece of foam; other wind screen geometries may also be used.

The drain tube 95 is coupled to the chamber 94 and drain output 99 for draining debris, water and/or other fluids into the ambient environment. Alternatively, the drain tube 95 could drain to the interior environment, or other regions, instead of the ambient environment if desired.

Figure 8:
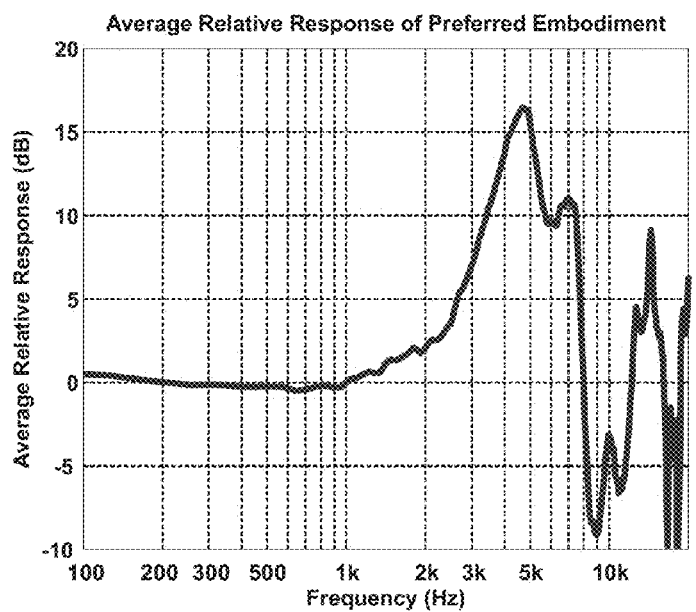
FIG. 8 is a plot of the improvement in acoustic response when an embodiment of the invention with slot perforations is incorporated in an ear cup of a headset.

FIG. 8 shows a plot depicting the difference in the response of a microphone mounted flush on the outer surface of an ear cup compared to the response of a microphone used in an embodiment of the invention in an ear cup with four slot perforations and similar aforementioned dimensions, at a range of audio frequencies. That is, the plot in FIG. 8 shows a graph of the improvement in microphone sensitivity when using an embodiment of the invention compared to flush-mounting the microphone.

The plot is an average of three measurements from three different incidence angles (front, side, back) for a plane pressure wave incident on the ear cup when placed on an acoustic manikin in an anechoic room. The response shows a gain in sensitivity in the frequency range from approximately 1 kHz to 8 kHz. In this frequency band, the signal-to-noise ratio has been improved by an embodiment of the invention because the self-noise of the microphone alone has not changed. The first resonance frequency of an embodiment of the invention in this embodiment is approximately 4.7 kHz. There are other resonances and antiresonances due to the headset geometry and invention above 4.7 kHz.

Although there are several higher-frequency ranges where the response is attenuated, there is a significant net gain in output sensitivity due to the resonance characteristics of an embodiment of the invention, which results in a significant net improvement in the IRSN.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An environmental protection device comprising:
a chamber comprising a plurality of sides enclosing a volume, one of the plurality of sides being formed by an outer surface of an earcup exposed to an ambient environment from which sound is to be detected by a microphone, at least part of the outer surface forming a perforated barrier which is perforated by at least one perforation passing through the outer surface from an ambient environment into the chamber;
the microphone having a microphone sensing surface, located in an upper region of the chamber, above at least one of the perforations;
a drain tube having a first end coupled to a lower region of the chamber and a second end coupled to a drain output for draining fluids from the chamber into the ambient environment located in the outer surface below a bottom of the perforated barrier; and
wherein an acoustic mass of the perforated barrier combined with an acoustic compliance of the chamber forms an acoustic resonator amplifying the sound at the microphone sensing surface by acoustic means around a resonance frequency of between 1 kHz and 8 kHz.

2. The environmental protection device of claim 1, in which the chamber has a volume of less than 2.32 cc and an average chamber depth of more than 1 mm.

3. The environmental protection device of claim 1, further comprising an auxiliary wind screen attached to the outer surface outside of the at least one perforation.

4. The environmental protection device of claim 3, in which the auxiliary wind screen has a geometry that follows a contour of the outer surface.

5. The environmental protection device of claim 3, in which the auxiliary wind screen is constructed of a material which reduces wind noise but does not alter the acoustic audio-frequency sound sensed by the microphone.

6. The environmental protection device of claim 3, in which the auxiliary wind screen is constructed of a material selected from a group consisting of mesh screen, cloth, gas-permeable membrane and foam.

7. The environmental protection device of claim 1, further comprising a gas permeable acoustic vent arranged between the microphone sensing surface and the chamber that restricts water from contacting the microphone sensing surface.

8. The environmental protection device of claim 7, in which there is an indirect unobstructed path from the ambient environment to the gas permeable acoustic vent.

9. The environmental protection device of claim 1, in which there is an indirect unobstructed path from the ambient environment to the microphone sensing surface.

10. The environmental protection device of claim 1, further comprising an elastomeric microphone coupler acoustically coupling the chamber to the microphone sensing surface.

11. The environmental protection device of claim 1, in which the perforated barrier is formed by a plurality of slots passing through the outer surface.

12. The environmental protection device of claim 11, in which the plurality of slots are greater than 0.5 mm in width.

* * * * *